US011066249B2

(12) United States Patent
Baumgardner et al.

(10) Patent No.: US 11,066,249 B2
(45) Date of Patent: Jul. 20, 2021

(54) LOADING TABLE ROLLER BRUSH ASSEMBLY (71) Applicant: Osborn, LLC, Richmond, IN (US)

(72) Inventors: Zachary Baumgardner, Lynn, IN (US); William Anthony Kennedy, Richmond, IN (US); Brian Keiser, Cambridge City, IN (US)

(73) Assignee: OSBORN, LLC, Richmond, IN (US)

( * ) Notice: Subject to any disclaimer, the term of this patent is extended or adjusted under 35 U.S.C. 154(b) by 0 days.

(21) Appl. No.: 16/674,178

(22) Filed: Nov. 5, 2019

(65) Prior Publication Data
US 2020/0138178 A1 May 7, 2020

Related U.S. Application Data (60) Provisional application No. 62/755,858, filed on Nov. 5, 2018.

(51) Int. Cl.
*B65G 39/02* (2006.01)
*A46B 9/02* (2006.01)
*A46D 3/00* (2006.01)
*A46D 1/00* (2006.01)
*B65G 39/07* (2006.01)
*F27D 3/02* (2006.01)
*B21B 39/00* (2006.01)

(52) U.S. Cl.
CPC .............. *B65G 39/02* (2013.01); *A46B 9/026* (2013.01); *A46D 1/0207* (2013.01); *A46D 3/00* (2013.01); *B21B 39/008* (2013.01); *B65G 39/07* (2013.01); *F27D 3/026* (2013.01); *A46B 2200/405* (2013.01)

(58) Field of Classification Search
CPC ........ B65G 39/02; B65G 39/07; A46B 9/026; A46B 13/003; A46B 2200/405; A46D 1/0207; A46D 3/00; F27D 3/026; B21B 39/008
USPC .......................................................... 193/37
See application file for complete search history.

(56) References Cited

U.S. PATENT DOCUMENTS

| 1,989,988 A | * | 2/1935 | Jones | .................... A23N 12/005 15/88.3 |
| 2,021,768 A | * | 11/1935 | Epp | ...................... A46B 13/003 15/182 |
| 3,087,599 A | * | 4/1963 | Nelson | .................... F27D 3/026 198/780 |

(Continued)

*Primary Examiner* — Gene O Crawford
*Assistant Examiner* — Keith R Campbell
(74) *Attorney, Agent, or Firm* — McDonald Hopkins LLC (57) ABSTRACT A transport roller brush assembly that includes a base that is constructed to support a plurality of brush wires such that the plurality of brush wires are oriented to extend in a radial direction relative to an axis of rotation of an underlying material transport roller. The base is preferably split into at least two arcuate portions that can be removeably secured to one another preferably via cooperation of a plurality of collar or collar portions and such that the respective and preferably two arcuate portions generally circumscribe a transport roller when the base is secured thereto. Discrete brush assemblies are preferably provided in a plurality of inner and outer radial dimensions such that roller brush assemblies as disclosed herein can be used with transport rollers of various outer radial dimensions.

22 Claims, 6 Drawing Sheets (56) References Cited

U.S. PATENT DOCUMENTS

| | | | | |
|---|---|---|---|---|
| 4,352,230 A | * | 10/1982 | Sukenik | B21B 39/008 |
| | | | | 432/246 |
| 4,402,390 A | * | 9/1983 | Feeney | B65G 39/04 |
| | | | | 193/37 |
| 5,687,833 A | * | 11/1997 | Dalessio, Jr. | B65G 39/06 |
| | | | | 193/35 SS |
| 5,702,338 A | * | 12/1997 | Morando | B21B 39/008 |
| | | | | 492/30 |
| 2010/0051412 A1 | * | 3/2010 | DeLanghe | B65G 39/04 |
| | | | | 193/37 |

* cited by examiner

FIG. 6

LOADING TABLE ROLLER BRUSH ASSEMBLY

CROSS-REFERENCE TO RELATED APPLICATIONS

This application claims priority to U.S. Provisional Patent Application Ser. No. 62/755,858 filed on Nov. 5, 2018 titled "Loading Table Roller Brush Assembly" and the disclosure of which is expressly incorporated herein.

FIELD

The present invention is directed to material transfer tables and, more particularly, to an assembly and method of constructing a roller collar assembly that includes a material supporting brush. The roller collar assembly provides improved non-marring material transfer performance and a roller collar assembly that can withstand high material temperatures common to many applications associated with use of material roller assemblies. The method and roller collar assembly disclosed herein further facilitate the placement and removal of the brush collar assemblies relative to underlying rollers in a manner that does not require removal of discrete rollers from underlying roller support assemblies.

BACKGROUND

Roller tables or roller conveyors are employed in a variety of industries to effectuate transport of materials from one location to another and/or to facilitate the placement and/or removal of conveyed materials relative to underlying equipment. Such material transfer structures commonly include a number of steel rollers that are disposed proximate one another and rotationally supported such that each of the rollers rotates relative to a support structure as a working material is transferred across the plurality of rollers. One such industry relates to metal working and forming environments wherein bulk metal materials, such as ingots, billets, or coils, can be subjected to one on more melting, annealing, tempering, quenching, hardening or rolling processes to manipulate the size, shape, chemical, and/or mechanical properties associated with the underlying metal materials. Commonly, multiple roller conveyers are deployed to facilitate the transfer of material and/or product between the discrete ancillary equipment associated with the material working processes. Depending on the particular nature of a given treatment process being effectuated, some treatment processes may present several undesirable aspects associated with the roller supported material treatment and transfer processes.

In a first aspect, metal on metal contact interfaces between the metal working materials and metal roller structures can allow for slippage or unintended and/or unexpected motion between the relative structures. Such relative translations can create deformities or blemishes such as gouges, scratches, and/or marring of the materials intended to be worked. Further, the orientation of the rollers as being commonly oriented parallel to one another limits the directional or steering control or translation of the materials being worked in directions that are not orthogonal to the axis of rotation of the discrete rollers. That is, placing materials relative to the roller assembly and relative to subsequent and/or previously employed equipment, material carriers, racks, or carriages or working materials can be problematic, particularly for newer operators, if translation of the materials is required in directions not orthogonal to the axis of rotation of the rollers and if marring or damaging of the materials is to be mitigated or avoided as disclosed further below.

Another concern associated with the desired usage of roller material transfer assemblies relates to providing a roller assembly that can accommodate the variable temporal parameters common to many metal material working processes. For instance, during annealing processes, bulk metal materials are commonly introduced and removed from heated environments in the form of furnaces or the like wherein the metal materials are commonly heated to several hundred degrees Fahrenheit temperatures. The composition of the material being heated and the intended resultant characteristics or material or mechanical properties of the annealed material are used to determine a desired annealing sequence or process associated with the respective material. Whether in a finished product form factor or intermediate product form factor, unintended contact with the material being worked with blemishes or discontinuities associated with discrete rollers associated with the roller transfer assembly can result in undesirable marring or blemishing of the material and products being worked. Depending on the degree and duration of the heating process, many heating or annealing processes soften the bulk metal materials to conditions wherein undesirable gouging or marring of the material can more easily occur. Such problems can be exacerbated by the properties of the materials being worked. That is, it should be appreciated that softer materials, such as aluminum, brass, copper, etc., are more susceptible to unintentional or undesirable marring or gouging than steel-type materials such as carbon steels and stainless steel materials. Regardless of the type of metal working material, such problems can be exacerbated at elevated material working temperatures and/or post annealing processes.

In an effort to mitigate these detriments, other approaches exist wherein the commonly metal material of the transfer rollers are coated or wholly replaced with rollers, or constructed to cooperate with a replaceable collar, formed of plastic or Kevlar® type materials. Unfortunately, such approaches include various shortcomings attenuate to providing material transfer roller structures having such constructions. Rollers, or roller collars, constructed of such non-metal materials are ill-equipped to withstand the temperatures associated with many metal working heating and annealing processes. That is, loading and unloading of heated metal materials relative to equipment associated with the heat processing must commonly be provided at temperatures below approximately 150° Fahrenheit to avoid damage to the non-metal material rollers or collars and/or to prevent contamination of the material being worked with the non-metal material of the rollers and/or gases associated with the surrounding environment. Such a requirement hinders both loading and unloading operations of the material furnaces until the previously heated material has achieved an only slightly greater than ambient heated condition in order to maintain operability of the non-metal roller material transfer equipment. With customary metal working and annealing temperatures in the range of several hundred to over 1000 degrees Fahrenheit, the ability of the loading and unloading roller transfer equipment to withstand only slightly elevated relative to ambient temperature conditions mitigates the instances of heated material related marring or gouging but such approaches substantially detracts from efficient utilization of the material heating equipment and/or facility personnel. Such approaches can also impede efficient utilization equipment and personnel associated with material processing operations that either proceed or are subsequent to the heat treatment operations.

Accordingly, there is a need of an assembly and method of providing a material transfer roller assembly that mitigates marring or gouging of materials transferred thereacross. A further need exists for a material transfer roller assembly that mitigates damage to material transferred thereby and which is constructed to withstand elevated working material temperatures. A still further need exists for a material transfer roller assembly that is constructed to withstand elevated working material temperatures and wherein the exterior surface of discrete rollers can be serviced and/or otherwise replaced in a manner wherein the underlying roller remains supported and associated with an underlying roller support assembly.

SUMMARY

The present application discloses an assembly and method of forming a roller brush assembly that overcomes one or more of the shortcomings disclosed above. One aspect of the present application discloses a transport roller brush assembly that includes a base that is constructed to support a plurality of brush wires such that the plurality of brush wires are oriented to extend in an outward radial direction relative to an axis of rotation of an underlying transport roller and to engage materials transported thereover. The base is preferably split into two arcuate portions that can be removeably secured to one another and such that the two arcuate portions generally circumscribe a transport roller when the respective bases are secured thereabout. In a preferred aspect, respective collars or collar portions are secured to the generally opposite longitudinal ends of each respective base portion and constructed to be secured to one another such that the base, and the respective plurality of brush wires associated therewith, are disposed between the collars when the brush assembly is secured to a respective transport roller. Discrete brush assemblies are preferably provided in a plurality of inner and/or outer radial dimensions such that brush assemblies as disclosed herein can be employed with transport rollers and ancillary equipment having various radial dimensions.

Another aspect of the present application that is usable or combinable with one or more of the various aspects and features disclosed above discloses a transport roller brush assembly having an arcuate tube that is defined by an inner surface and an outer surface. A radius of curvature associated with the inner surface of the tube approximates a radius associated with an outer radial dimension of a solid surfaced material transport roller whose opposite ends are supported by a respective roller support frame. A plurality of brush wires extend in an outward radial direction beyond the outer surface of the arcuate tube and are oriented to engage, and thereby support, materials translated over the arcuate tube. A first collar and a second collar are each associated with a respective longitudinal end of the arcuate tube and constructed to secure the arcuate tube to an underlying roller.

A further aspect of the present application that includes one or more features or aspects that are useable or combinable with one or more of the elements, features, or aspect disclosed above discloses a transport roller brush assembly having a first brush panel and a second brush panel. Each brush panel has a generally arcuate shape and is defined by a respective base and a plurality of brush wires that extend in an outward radial direction from the respective base. In a preferred aspect, an end collar is associated with each respective opposite longitudinal end of each respective base associated with the first brush panel and the second brush panel and a plurality of fasteners that are constructed to cooperate with the end collar associated with each of the first and second brush panels such that the first brush panel and the second brush panel circumscribe a portion of a circumference of a solid surfaced material transfer or transport roller when the transport roller brush assembly is secured thereabout. Such a construction ensures that the plurality of discrete filaments associated with the respective brush panels mitigate contact interaction between the material being transported and the respective collars, respective bases, and/or the surface of an underlying solid surface transport roller.

Another aspect of the present application that is useable or combinable with one or more of the discrete features, objects, or aspects disclosed above includes a method of forming a material transport roller that includes a plurality of brush wires that are secured to a base that is shaped to be disposed about at least a portion of a transport roller such that the plurality of brush wires extend in an outward radial direction relative to the base and the transport roller when the base is disposed thereabout.

These and other aspects, features, and advantages of assemblies and methods according to the present application will be further appreciated by those in the art from the enclosed drawings, the brief description thereof, the following detailed description, and the appending claims.

DRAWING DESCRIPTION

One or more preferred exemplary embodiments of the invention are illustrated in the accompanying drawings in which like reference numerals represent like parts throughout and in which.

Before explaining one or more embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and therefore should not be regarded as limiting.

DETAILED DESCRIPTION

Figure 1:
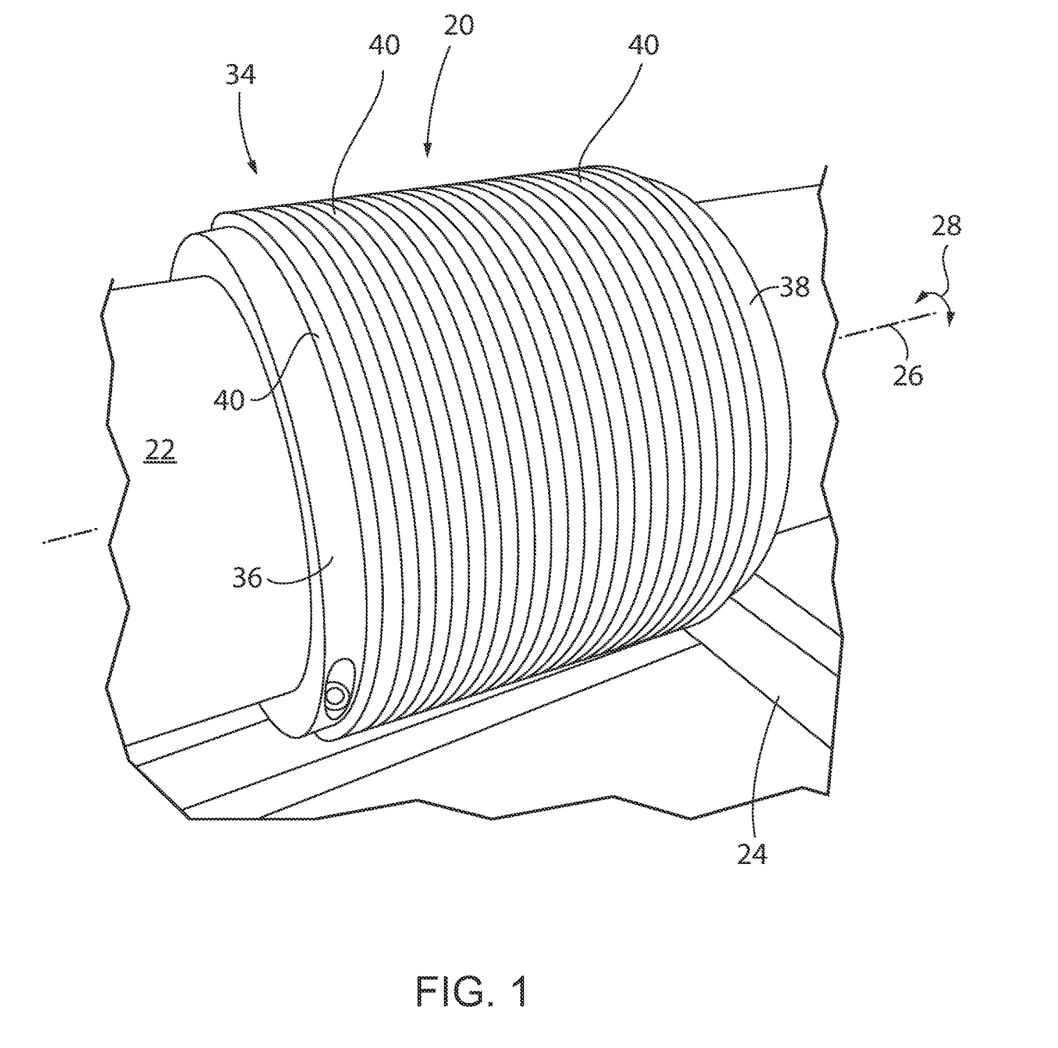
FIG. 1 is a perspective view of a transport roller brush assembly according to the present invention engaged with an exemplary transport roller.
Figure 2:
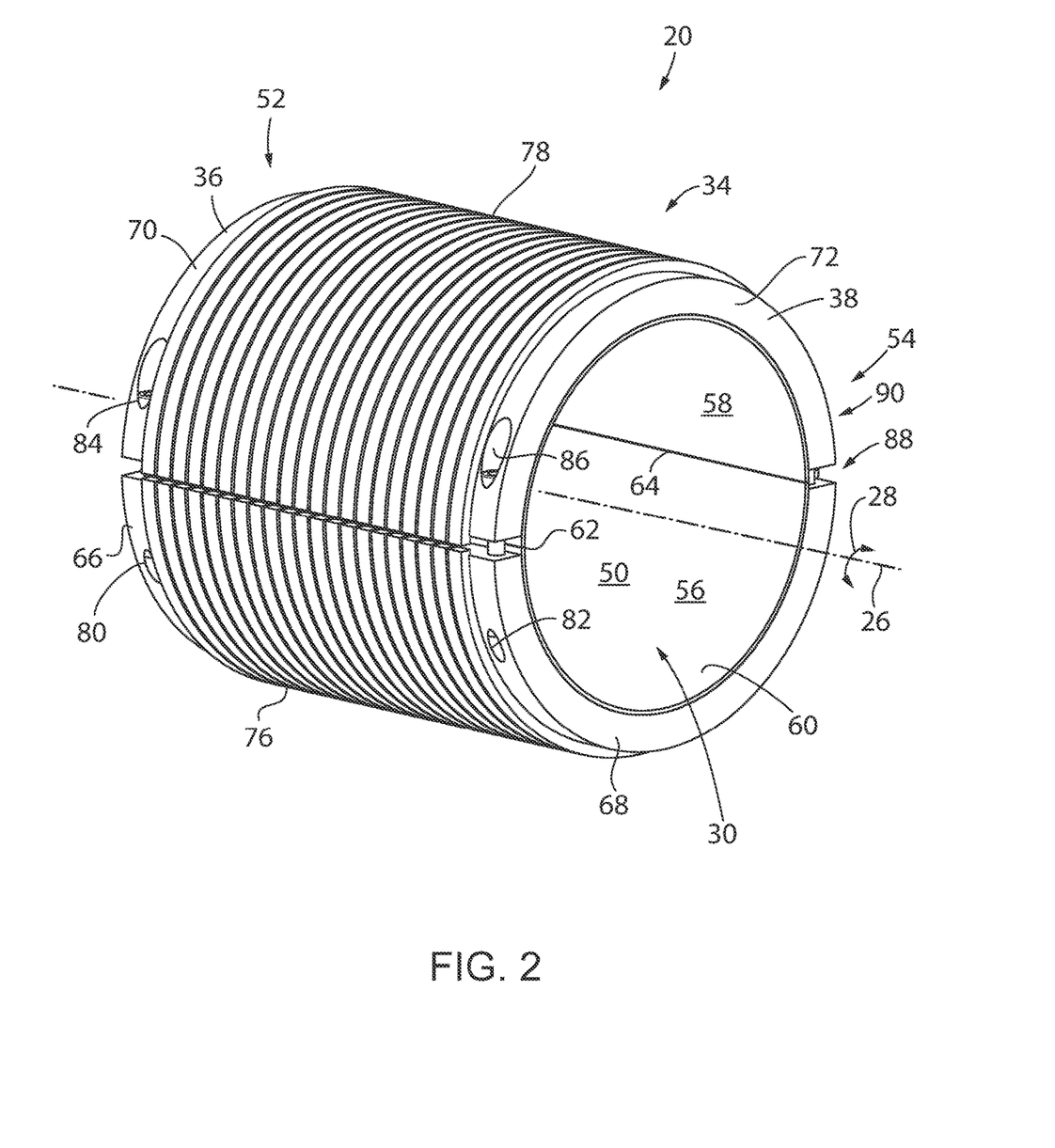
FIG. 2 is a perspective view of the transport roller brush assembly shown in FIG. 1 removed from the exemplary transport roller.

FIGS. 1 and 2 illustrate respective perspective views of a transport roller brush assembly or roller brush assembly 20 according to the preferred embodiment of the present invention. With respect to FIG. 1, roller brush assembly 20 is shown secured to a transport roller 22 that is mounted to a frame 24 such that transport roller 22, and roller brush assembly 20 secured thereto, rotate about an axis, indicated by line 26, in respective rotational directions, indicated by arrow 28, during use of transport roller 22. Roller brush assembly 20 is preferably secured to transport roller 22 such that roller brush assembly 20 is preferably non-rotatable relative to transport roller 22 but such that roller brush assembly 20 rotates concurrently with transport roller 22 relative to frame 24 during rotation thereof. It should be further appreciated that transport roller 22 may be provided in various support and/or drive arrangements to satisfy the demands associated with implementation of the same. That is, it is appreciated that transport roller 22 may be configured to support a material translated thereacross such that driving forces imparted to the material intended to be translated thereacross effect rotation of transport roller 22 and roller brush assembly 20 about axis 26 or may be itself be driven to effectuate powered translation of materials associated therewith. As disclosed further below, roller brush assembly 20 is disposed between roller 22 and the materials transferred thereby such that roller brush assembly 20 supports the materials being translated and in a manner that prevents contact between the materials and outermost radially oriented surfaces of a respective transport roller 22. It is further appreciated that although one roller brush assembly 20 is shown in FIG. 1, roller support assemblies may include one or more roller brush assemblies 20 and that discrete roller brush assemblies 20 are constructed to be disposed anywhere along the axial operating length of the discrete rollers 22 as well as one or more of a plurality of transport rollers 22 that may be positioned adjacent one another and/or as the situation and/or application may require.

Referring to FIG. 2, transport roller brush assembly 20 is shown removed from transport roller 22 exposing a core passage 30 defined thereby. As disclosed further below, roller brush assembly 20 is constructed to be secured to transport roller 22 in a manner that does not require removal of the respective underlying discrete transport roller 22 from an underlying support assembly, such as a pillow block or the like, or the removal of the underlying support assembly from either respective end of the discrete transport roller 22 with which roller brush assembly 20 is to be associated. As disclosed further below, roller brush assembly 20 is constructed to be split in the longitudinal direction along one or more seam lines such that the discrete halves or other numbers of arcuate portions can be removed and associated with an underlying roller 22 in relative outward radial directions rather than respective longitudinal directions. It is however appreciated that a number of the advantages associated with use of roller brush assembly 20 could be realized were roller brush assembly 20 provided in a non-splittable construction inapposite to the splittable construction of the roller brush assembly 20 as disclosed further below. Such configurations are encompassed by the scope of the claims as presented herein.

Referring to FIGS. 1 and 2, roller brush assembly 20 includes a brush arrangement 34 that are preferably disposed between a first collar 36 and a second collar 38 associated with the discrete opposing longitudinal ends of each respective roller brush assembly 20. It is further appreciated that roller brush assembly 20 may be providing in various longitudinal lengths, or dimensions aligned with axis of rotation 26, and various inner diameter dimensions, outer diameter dimensions, and/or configuration including intermediate collars disposed between collars 36, 38 when roller brush assembly 20 is provided in more elongated configurations.

Figure 3:
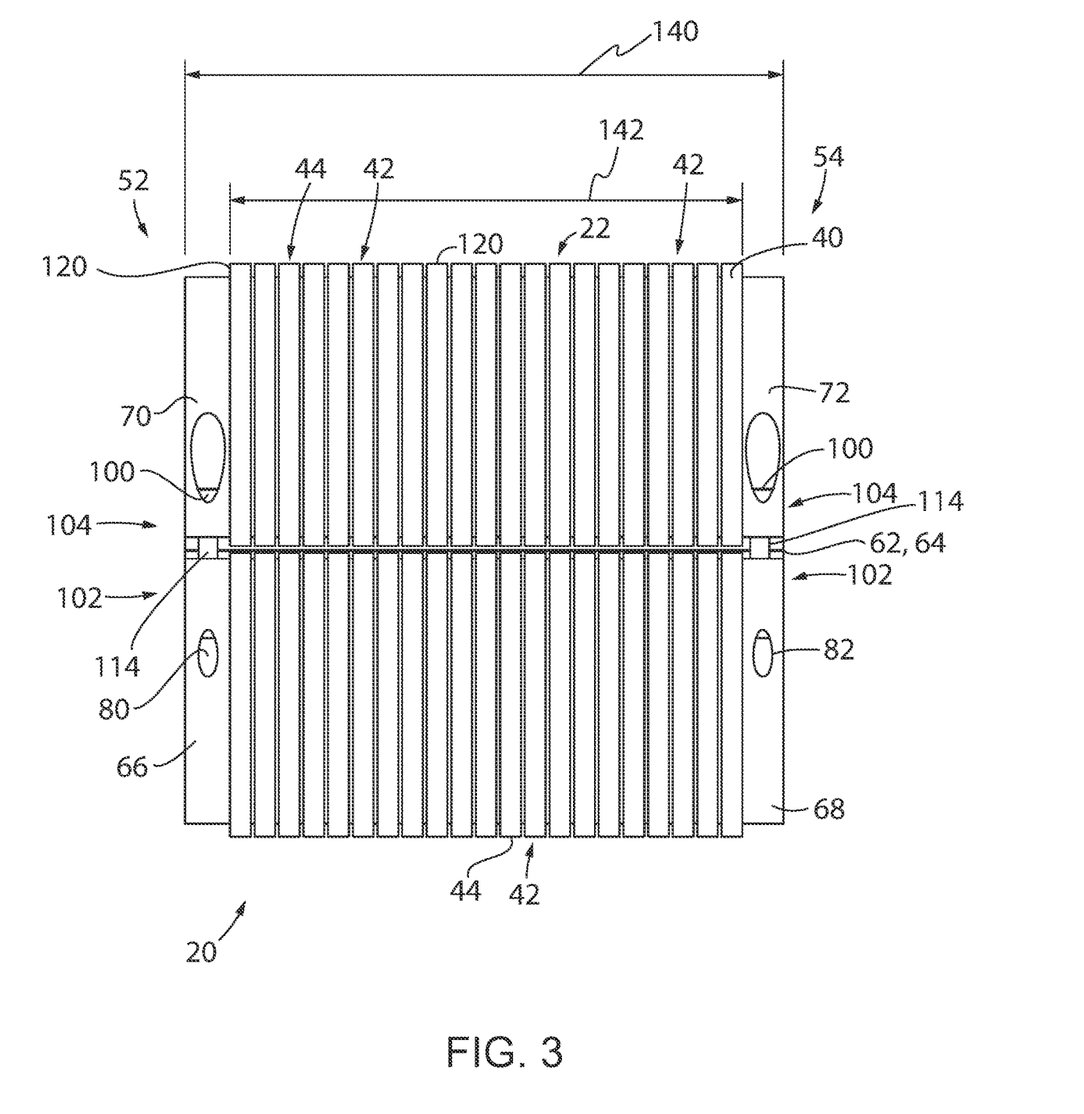
FIG. 3 is a side elevation view of the transport roller brush assembly shown in FIG. 2.
Figure 4:
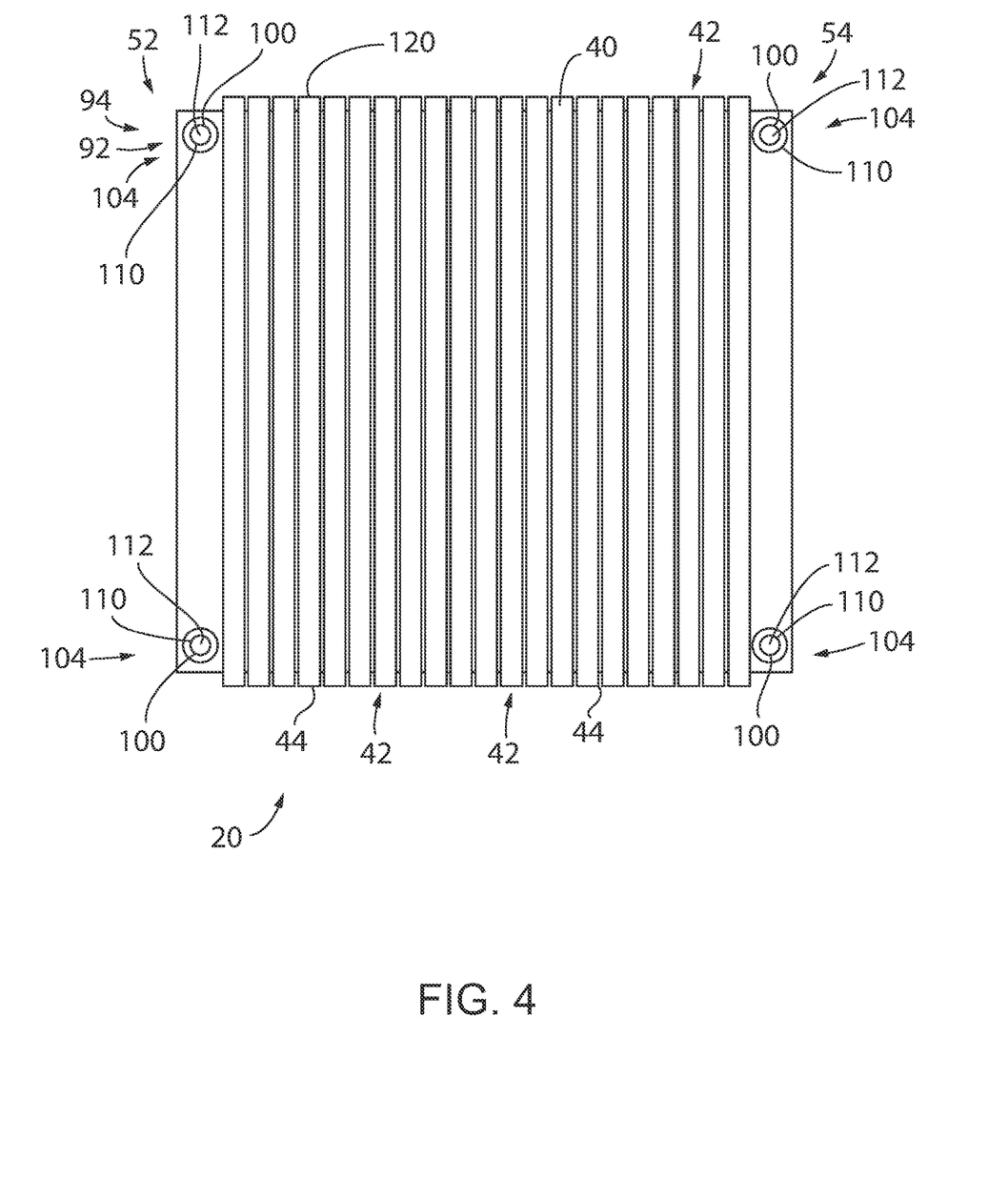
FIG. 4 is a plan view of the transport roller brush assembly shown in FIG. 2.

Regardless of the relative internal and external diameters and longitudinal lengths associated with roller brush assembly 20, brush arrangement 34 of each roller brush assembly 20 includes a plurality of discrete brush filaments or brush wires 40 that are each oriented to extend in a generally outward radial direction relative to axis of rotation 26. Referring to FIGS. 2-4, and as disclosed further below with respect to FIG. 6, brush wires 40 are oriented in a plurality of rows 42 that extend in an arcuate manner and generally circumferentially about roller brush assembly 20. Discrete rows 42 of brush wires 40 are separated from one another via respective nominal gaps 44 formed between discrete adjacent rows 42 of brush wires 40. Each of gaps 44 along the longitudinal length are arcuate or curved surface of roller brush assembly 20 facilitate welding together of the adjacent discrete rows 42 of brush wires 40. Brush wires 40 are preferably formed of metal materials such as carbon steel and stainless steel materials as well as other materials.

It is appreciated that the construction and material of the plurality of brush wires 40 will depend largely on the materials or equipment intended to be supported and/or transported and the temperatures of such materials and/or carriers during translation of the same across the discrete roller brush assembly 20. In one aspect particularly suitable to metal annealing operations and the loading and unloading of heated metal materials, brush wires 40 are provided at densities of approximately 18 filaments per brush, at a density of approximately 120 grams per 10 inches of brush, and formed of metal materials such as 302 or 304 grade stainless steel materials. The discrete filaments or brush wires 40 are provided at turn rates of approximated 20 turns per discrete brush section. Such considerations provide a brush arrangement that can withstand temperatures of approximately 2200 degrees Fahrenheit and provide several hundred pounds of support per square inch of contact area and do so in a manner that mitigates or avoids marring, gouging, or otherwise blemishing the materials or equipment being transported thereacross. It should be appreciated that the material, the number of turns, the filament size, the filament densities and the filament construction, etc. can be manipulated to provide an economical roller brush assembly constructed in accordance with the disclosure of the present application and provide roller brush assemblies capable of withstanding less extreme operating environment and/or transfer material conditions. Such alternatives are also encompassed by the claims as presented herein.

Regardless of the intended application or specific brush filament material and construction, brush wires 40 and the discrete rows 42 associated therewith, are secured to a base 50 (FIG. 2) that extends longitudinally between a respective first longitudinal end 52 and a second longitudinal end 54 associated with respective collars 36, 38 of roller brush assembly 20. As alluded to above, in a preferred embodiment, base 50 includes a first portion 56 and a second portion 58 that each have arcuate shapes defined by a radius of curvature coincident with axis 26 such that first portion 56 and second portion 58 of base 50 have generally mirror image constructions of one another relative to an inner radial surface 60 of base 50. Base portions 56, 58 cooperate with one another so as to define respective seam edges 62, 64 that extend along the longitudinal direction of roller brush assembly 20. Although shown as being defined by a pair of generally mirror image halves or portions, it is appreciated that roller brush assembly 20 may be provided to have discrete numbers of respective seam edges 62, 64 other than the two shown.

When provided in a respective half portion construction as shown in the drawings, respective collars 36, 38 each include respective first portions 66, 68 and corresponding respective second portions 70, 72 that each have generally arcuate shapes so as to be respective mirror images of one another relative to a plane coincident with seam edges 62, 64 associated with first and second base portions 56, 58; i.e. an imaginary plane that is coincident with the axis defined by seam edges 62, 64 and the longitudinal axis 26 of roller brush assembly 20. Brush arrangement 34 similarly includes a first portion 76 and a second portion 78 that each have respective arcuate shapes generally defined by a radius that is coincident with axis 26 and such that first and second brush portions 76, 78 are also generally mirror images of one another relative to a plane coincident with seam edges 62, 64 defined by base portions 56, 58 and coincident with axis 26. Such a construction allows roller brush assemblies 20 to be selectively separated or split along the plane defined by seam edges 62, 64 such that, as alluded to above, roller brush assembly 20 can be removed and/or secured relative to transport roller 22 in a manner that does not require freeing of a discrete respective end of transport roller 22. Said in another way, roller brush assembly 20 can be selectively secured and removed from transport roller 22 in outwardly extending radial directions relative to the axis 26 or rotation thereof.

Such considerations allow roller transport beds or tables to be quickly and efficiently configured for use with one or more brush roller assemblies 20 and/or repurposed for other applications wherein use of roller brush assembly 20 may be undesired. Such considerations also facilitate expedient maintenance, replacement, and/or service of roller brush assemblies 20 when in use. Such considerations further allow the replacement of only discrete portions of discrete respective roller brush assemblies 20 should the same be damaged or otherwise rendered unusable. Understandably, if provided in 120 degree increments or 90 degree increments, for example, rather than the 180 degree increments associated with seam lines or seam edges 62, 64, would facilitate replacement or servicing of only discrete damaged or otherwise unusable portions of discrete roller brush assemblies 20 rather than the entirety of a discrete damaged roller assembly when the discrete roller assemblies are provided in non-severable configurations.

Referring to FIGS. 2-5, each respective collar portion 66, 68, 70, 72 includes a respective passage 80, 82, 84, 86, 88, 90, 92, 94 associated with cooperating with a respective fastener 100 associated therewith. Respective passages 80, 82, 84, 86, 88, 90, 92, 94 are each associated with a respective end portion 102, 104 of the arcuate shape of respective portions 66, 68, 70, 72 associated with collars 36, 38. Each fastener 100 includes a head portion 110 that defines a drive arrangement 112 and a threaded body 114 that extends therefrom. Each head portion 110 and threaded body 114 of each respective fastener 100 cooperates with a respective passage 84, 86, 90, 92 and threadably cooperates with a corresponding passage 80, 82, 88, 94 associated with the opposing collar portions 66, 68 to facilitate the securing of respective arcuate half portions of roller brush assembly 20 relative to a discrete roller 22 when the discrete fasteners 100 are engaged therebetween.

As shown in FIG. 4, in a preferred aspect of the present invention, each head portion 110 associated with fasteners 100 is oriented to face in a common direction relative to a top plan view of roller brush assembly 20. Such a consideration facilitates manipulation of each fastener 100 from a common direction relative to roller brush assembly 20 when the same is secured to a support or transport roller 22 and without rotation of the same. Technicians equipped with driving tools can engage and manipulate each fastener 100 without rotation of roller brush assembly 20 and/or the discrete underlying transport roller 22 to effectuate the desired removal and/or association of a discrete roller brush assembly 20 with an underlying support or transport roller 22. It is however appreciated that fasteners 100, and the discrete portions 66, 68 of collars 36, 38 could be constructed such that respective fasteners slideably cooperate with discrete collar portions 66, 68 such that the same approach from respective opposite or respective radial directions relative to portions 66, 68 of collars 36, 38 accommodates the desired presentation of the fasteners 100 for driving interaction therewith.

Referring to FIGS. 2-5, it should be appreciated that a radially outermost surface 120 or exterior surface defined by brush arrangement 34 is oriented further from axis 26 than an outermost radial surface 122 of any of respective collar portions 66, 68, 70, 72 such that any material transported across roller brush assembly 20 is fully supported by the radially outermost distal end surface 124 of brush arrangement 34 rather than any of the more physically solid or rigid structures associated with roller brush assembly 20. That is, materials translated over roller brush assembly 20 interact with the brush arrangement 34 rather than any portion of collars 36, 38 or the underlying transport roller 22. The controlled deflection and spacing provided by the discrete filaments or wires associated with brush arrangement 34 accommodate the non-marring and elevated temperature tolerating translation of discrete heated metal materials in a non-damaging methodology via roller brush assembly 20.

Figure 5:
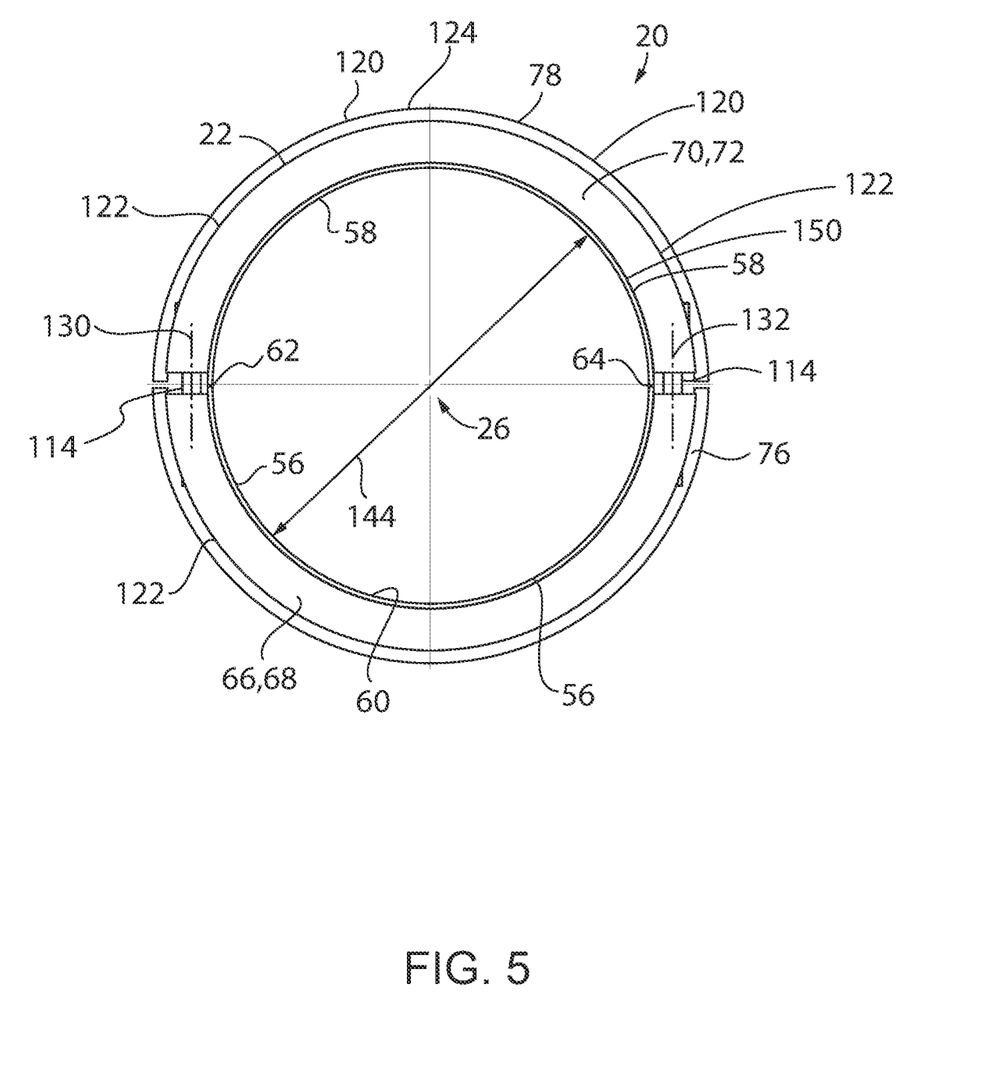
FIG. 5 is a longitudinal end elevation view of the transport roller brush assembly shown in FIG. 2.

Referring to FIGS. 2, 3, and 5 it should be further appreciated that the engagement of fasteners 100 relative to respective collar portions 66, 68, 70, 72, and the respective passages 80, 82, 84, 86, 88, 90, 92, 94 defined thereby, allows fasteners 100 to extend along discrete axes, indicated by lines 130, 132, in a manner that extends in a secant geometric orientation relative to the substantially circular cross-sectional geometry of roller brush assembly 20 and in a manner whereby the entirety of fasteners 100 are preferably located radially inboard relative to radially outermost surface 122 of respective collar portions 66, 68, 70, 72—which are themselves disposed radially inboard of the exterior surface defined by the discrete brush arrangements 34, and defined by and positioned radially outboard relative to the radially inward facing surface of base 50. Such considerations mitigate any contact or engagement of fasteners 100 with material transported via cooperation with roller brush assembly 20 and mitigate or otherwise negate any alteration of transport roller 22 during securing or removal of roller brush assembly 20 relative thereto. Said in another way, when unnecessary for a given application and/or if undesired for a particular use, it is appreciated that brush roller assemblies 20 can be quickly and efficiently associated with discrete transport rollers 22 when use of the same is desired and expeditiously removed therefrom if use of the same is unnecessary or undesired when an anticipated alternate use of transport rollers 22 is desired.

FIGS. 3 and 5 include various exemplary dimensions with respect to the construction of roller brush assembly 20 although it is appreciated that roller brush assembly 20 may be provided in any number of dimensional configurations to satisfy the variable dimensions associated with respective underlying transport roller constructions, the materials and conditions associated with the placement and use thereof, etc. As shown therein, roller brush assembly 20 is provided in a relative overall longitudinal length, indicated by dimension line 140, a longitudinal length 142 associated with the exposed radially outermost surface 120 of brush arrangement 34, and an exemplary inner dimension, indicated by dimension line 144, associated with the radially innermost radial surface 60 of respective base portions 56, 58 when roller brush assembly 20 is fully assembled and/or otherwise secured to an underlying transport roller. As disclosed above, it is appreciated that the inner most radial dimension associated with the diameter 144 of roller brush assembly 20, as well as brush face length 142 and roller brush assembly longitudinal length 140, can be provided in virtually any number of configurations.

Preferably, inner diameter dimension 144 is provided in accordance with an outer diameter associated with transport roller 22. The radial thickness associated with respective collar portions 60, 68, 70, 72 are configured to be secured to an outer radial surface 150 associated with respective base portions 56, 58 and such that the outer radial dimension associated with radially outermost surface 122 of respective collar portions 66, 68, 70, 72 is less than the outer radial dimension associated with circumferential distal end or radially outermost surface 120 associated with brush arrangement 34. Such considerations allow roller brush assembly 20 to be provided in any number of configurations for cooperation with any number of material transport roller dimensions and in configurations wherein the outermost radial surface 120 associated with brush arrangement 34 is greater than a dimension associated with radially outermost surface associated with respective collar portions 66, 68, 70, 72 and/or respective base portions 56, 58. Such considerations ensure that materials transported via interaction with roller brush assembly 20 interact only with the discrete radially outermost portions brush wires 40 associated with brush arrangement 34, whether terminal ends or discrete folds associated with the discrete brush wires, and are otherwise positioned in such a manner that the remaining structures defined by respective collar portions 66, 68, 70, 72 and/or the material transport roller 22 are isolated from contact with the material and/or material transporting carriages or the like being transferred via interaction with roller brush assemblies 20.

Figure 6:
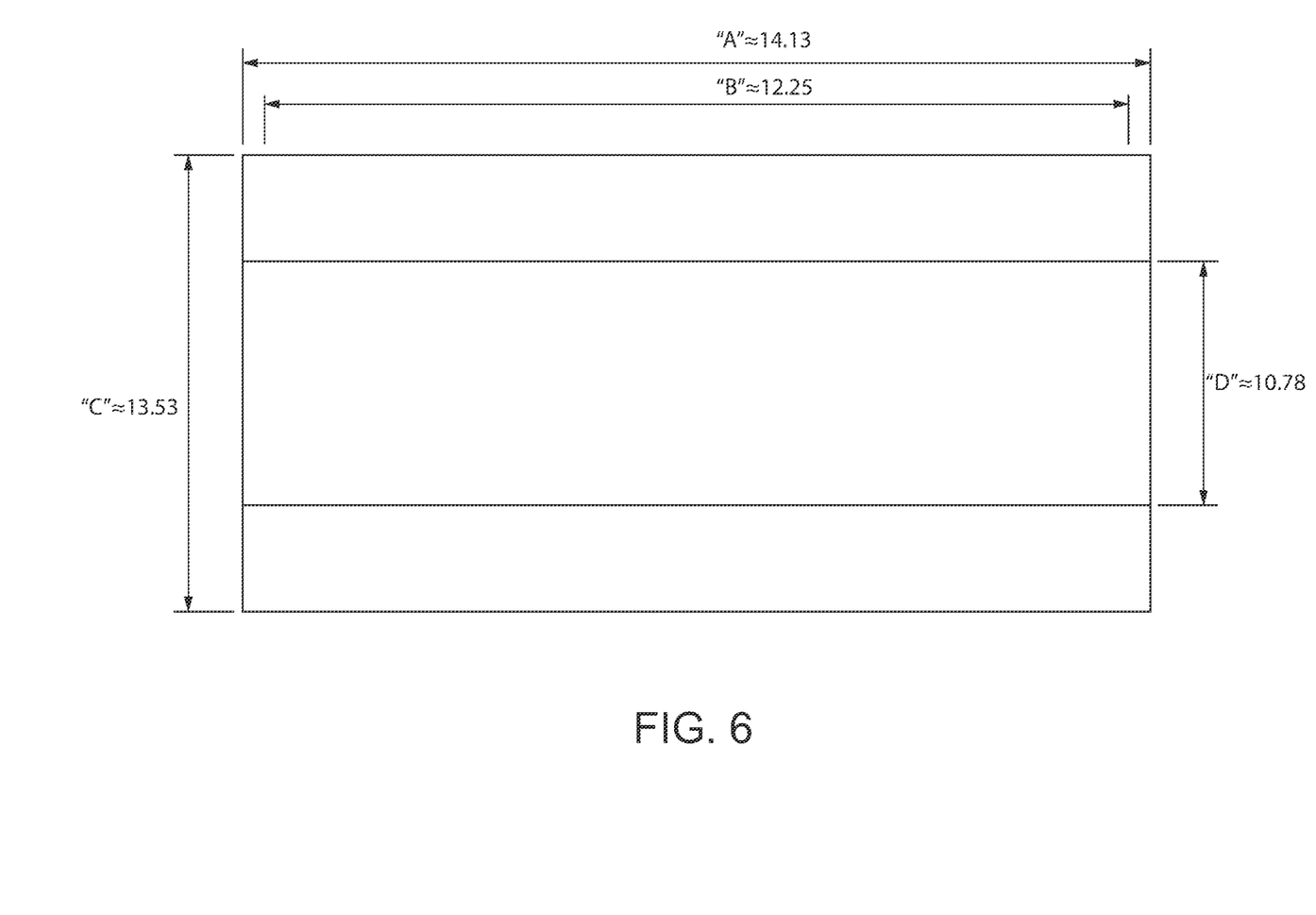
FIG. 6 is a geometric representation of a cross section view of the roller brush assembly shown in FIG. 2 and is described further below with respect to a method of forming respective arcuate half portions of the brush assembly shown therein.

FIG. 6 shows an exemplary geometric representation of a cross section associated with formation of the brush arrangement 34 associated with roller brush assembly 20. During formation of roller brush assembly 20, 20-21 strips at approximately 33.75 inches length of brush material are provided and formed into a 360 radial degree circle and then cut in half such that each discrete strip forms two 180 degree arcs of brush strip material for cooperation with one of respective portions 56, 58 of base 50. Base 50 is defined by a circumferential tube and portions 56, 58 are defined as respective halves of the circumferential tube. Twenty to twenty one brush arcs are welded to the exterior radial surface of each respective half of the circumferential tube such that 40 to 42 discrete brush arcs define brush arrangement 34. During placement of the brush arcs relative to portions 56, 58 or tube halves of base 50 or the initial tube, approximately 0.25 inch is provided between adjacent brush strip arcs to accommodate welding of the discrete brush arcs to the respective portions 56, 57 or tube halves defined by base 50. Respective collar portions 66, 68, 70, 72 can be secured to respective longitudinal ends of base portions 56, 58 prior to or after securing of the discrete brush arcs relative thereto.

The exemplary dimensions referenced above form a roller brush assembly 20 having the dimensions discussed above and shown in FIGS. 3-5 and wherein, with respect to FIG. 6, dimension A is indicative of an overall exemplary longitudinal length of roller brush assembly 20, dimension B is indicative of an overall exemplary longitudinal length associated with the outermost radial surface of brush arrangement 34, dimension C is indicative of an overall exemplary outer radial diameter of roller brush assembly 20, and dimension D is indicative of an overall exemplary inner radial diameter of brush arrangement 34. As indicated above, such dimensions are merely exemplary and it is appreciated that roller brush assembly 20 can be provided in a plethora of geometric constructions as a function of the intended size and shape of transfer roller 22 and material with which the same is intended to effectuate the desired transfer thereof.

The construction of roller brush assembly 20 is uniquely tailored to provide furnace entry and/or discharge roller arrangement wherein users can avoid or reduce equipment dwell times by allowing the roller assemblies to tolerate and/or otherwise interact with hotter materials and/or carriers in a non-damaging manner. That is, the user is not required to allow the metal materials or carriers to cool substantially or at all prior to association of the heated ingots or other materials with the roller brush assemblies 20 during loading and unloading operations associated with use of entry tables and/or the placing of the ingots into heating appliances such as furnaces or the like. Roller brush assembly 20 also mitigates concerns associated with scarring, marring, or otherwise blemishing the heated materials and/or slippage of the heated materials such as ingots or the like during transfer operations. The split construction of roller brush assembly 20 also facilitates quick placement and/or replacement of discrete roller brush assemblies 20 relative to the underlying transfer roller. Roller brush assembly 20 also mitigates concerns associated with degradation of the brush roller assemblies due to use under heated conditions associated with the materials transferred thereacross as are customary and problematic to plastic and Kevlar® type material transfer roller sleeves. The robust construction of roller brush assembly 20 also mitigates concerns associated with maintenance and equipment downtime as disclosed further above.

Accordingly, roller brush assembly 20 provides a material transport support assembly that can be economically produced relative to the equipment downtime and energy consumption associated with similar purpose rollers wherein such rollers or roller sleeves are incapable of withstanding the operating conditions accommodated by roller brush assembly 20. Further, the modular construction of roller brush assembly 20 allows users to specify the size and material of the roller brush assembly as well as brush arrangements such that the same can be individually tailored to given applications and/or operating conditions. Roller brush assembly 20 also allows for changing the interface mechanics associated with utilization of roller brush assembly 20, wherein brush arrangement 34 is formed of one material, such as stainless steel, and the underlying transport roller 22 is formed of an alternate, and quite often consumable softer material, such as aluminum, wherein the contact engagement between the roller brush assembly 20 mitigates contamination and is less susceptible to temperature damage associated with transfer of heated materials such as aluminum. That is, in addition to protecting the surface quality and integrity of treated materials that are transported thereacross, roller brush assembly 20 also protects the integrity and condition of underlying transport rollers whose construction and transport surfaces may be ill-suited or wholly incapable of tolerating or accommodating transport of comparable materials under comparable conditions as those provided by roller brush assembly 20.

It is to be appreciated that the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A transport roller brush assembly comprising:
    an arcuate tube defined by an inner surface and an outer surface and wherein a radius of curvature of the inner surface approximates a radius of a roller whose opposite ends are supported by a frame;
    a plurality of brush wires that extend in an outward radial direction beyond the outer surface of the arcuate tube and are oriented to engage material translated over the arcuate tube;
    a first collar and a second collar that are each associated with a respective longitudinal end of the arcuate tube and constructed to secure the arcuate tube to the roller; and
    at least one seam defined by each of the arcuate tube, the first collar, and the second collar and that extends in a longitudinal direction such that the arcuate tube, the first collar, and the second collar engage the roller from a radial direction relative to the longitudinal direction.

2. The transport roller brush assembly of claim 1 wherein the arcuate tube is further defined by a first portion and a second portion that cooperate with one another to define a circumference of the arcuate tube.

3. The transport roller brush assembly of claim 2 wherein the at least one seam is further defined as a first seam line and a second seam line that are each defined by a longitudinal interface between the first portion and the second portion of the arcuate tube.

4. The transport roller brush assembly of claim 3 wherein the first seam line and the second seam line each extend in the longitudinal direction to bifurcate each of the first collar and the second collar into respective halves.

5. The transport roller brush assembly of claim 1 wherein the plurality of brush wires are oriented in a plurality of respective rows that extend circumferentially about the outer surface of the arcuate tube.

6. The transport roller brush assembly of claim 5 further comprising a gap formed between adjacent rows of the plurality of respective rows of the plurality of brush wires.

7. The transport roller brush assembly of claim 1 wherein the plurality of brush wires are welded to the arcuate tube.

8. The transport roller brush assembly of claim 1 wherein the first collar and the second collar each include a first collar portion and a second collar portion that are generally mirror images of one another.

9. The transport roller brush assembly of claim 8 further comprising a plurality of fasteners wherein each of the fasteners is constructed to cooperate with the respective first collar portion and engage the second collar portion such that each of the fasteners extends along an axis that defines a secant relative to the respective one of the first collar and the second collar.

10. A transport roller brush assembly comprising:
    a first brush panel and a second brush panel, each of the brush panels having an arcuate shape and being defined by a base and a plurality of brush wires that extend in an outward radial direction from the base;
    an end collar associated with each respective opposite longitudinal end of the base of the first brush panel and the second brush panel; and
    a plurality of fasteners constructed to cooperate with the end collar associated with the first brush panel and the second brush panel such that the first brush panel and the second brush panel circumscribe a material transfer roller when the transport roller brush assembly is secured thereabout.

11. The transport roller brush assembly of claim 10 wherein the plurality of brush wires are oriented in a plurality of rows that each extend in a circumferential orientation when the transport roller brush assembly is secured about the material transfer roller and the plurality of rows are spaced from one another in a direction aligned with a longitudinal axis of the transport roller brush assembly.

12. The transport roller brush assembly of claim 11 wherein each of the plurality of rows of plurality of brush wires are welded to the base of the respective one of the first brush panel and the second brush panel.

13. The transport roller brush assembly of claim 10 wherein an outward radial end of the plurality of brush wires extends in an outward radial direction beyond an outward radial edge of each of the end collars.

14. The transport roller brush assembly of claim 10 wherein each of the first brush panel and the second brush panel have the same radius of curvature and the radius of curvature is selected to correspond to a radius of curvature of an exterior surface of a support roller.

15. The transport roller brush assembly of claim 10 wherein the transport roller brush assembly can withstand temperatures up to at least 2200 degrees Fahrenheit.

16. The transport roller brush assembly of claim 10 wherein the plurality of brush wires are formed of a metal material.

17. The transport roller brush assembly of claim 16 wherein the metal material is selected from a group of metal materials that includes stainless metal materials and carbon steel materials.

18. A method of forming a material transport roller, the method comprising:
    securing a plurality of brush wires to a base that is shaped to be disposed about a transport roller such that the plurality of brush wires extend in an outward radial direction relative to the base when the base is disposed about the transport roller; and
    forming the base in a first portion and a second portion that each have arcuate cross sectional shapes that are mirror images of one another.

19. The method of claim 18 further comprising securing a collar to each longitudinal end of the first portion and the second portion of the base and such that a distal end of the plurality of brush wires is further from an axis of rotation of the transport roller than an outermost radial surface of each of the collars.

20. The method of claim 19 further comprising passing a fastener through the collar and engaging the fastener with the collar associated with an opposing one of the first portion and the second portion of the base such that the fastener cooperates with two collars and extends along a longitudinal axis that is disposed at a radial location between a radially outermost surface of the transport roller and a radially outermost surface of the plurality of brushes.

21. The method of claim 18 further comprising forming the plurality of brush wires from at least one of a stainless steel metal material and a carbon steel material.

22. The method of claim 18 further comprising securing the base to the transport roller.

\* \* \* \* \*